Figures 1, 2:
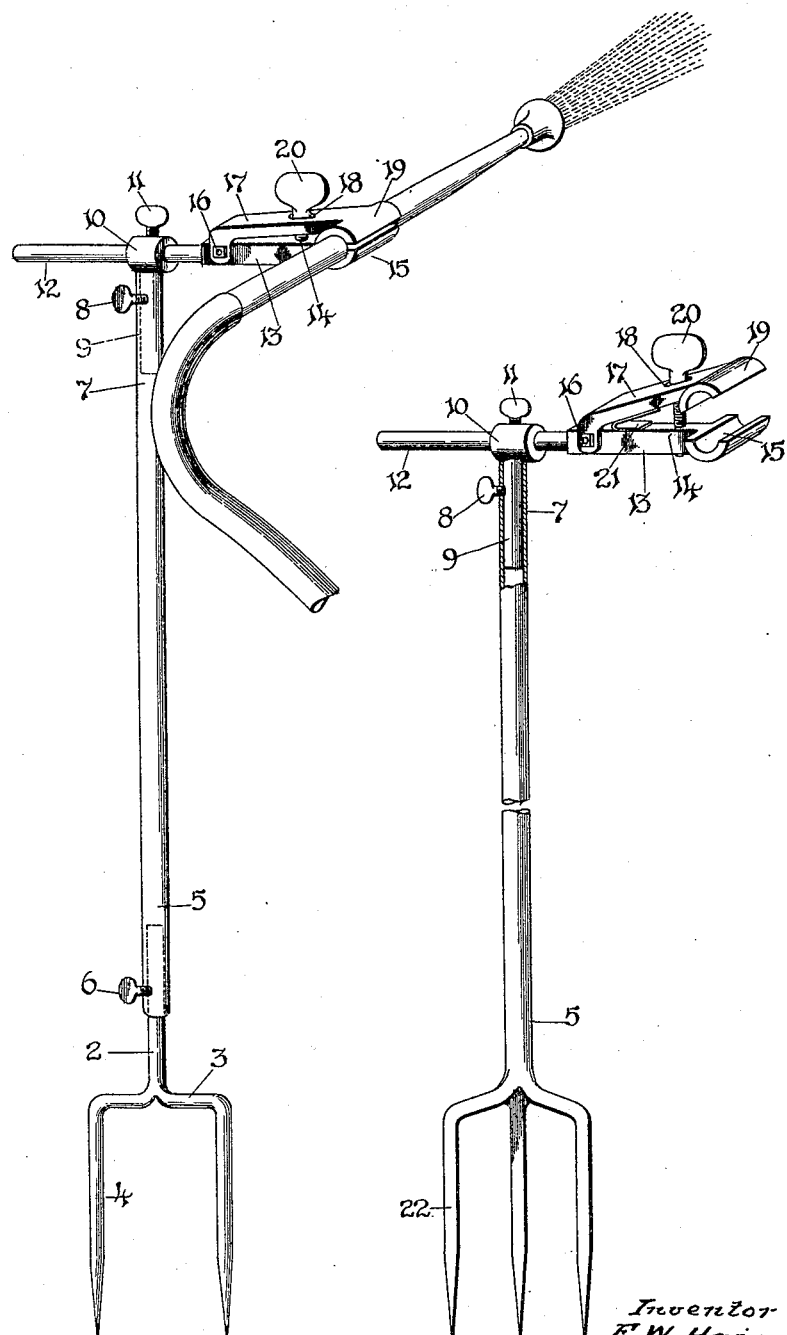

F. W. HAINES.
GARDEN HOSE SUPPORT.
APPLICATION FILED FEB. 10, 1913.

1,085,084.

Patented Jan. 20, 1914.

Witnesses

Inventor
F. W. Haines

UNITED STATES PATENT OFFICE.

FREDERICK WILLIAM HAINES, OF EAST MALVERN, MELBOURNE, VICTORIA, AUSTRALIA.

GARDEN-HOSE SUPPORT.

1,085,084. Specification of Letters Patent. Patented Jan. 20, 1914.

Application filed February 10, 1913. Serial No. 747,497.

*To all whom it may concern:*

Be it known that I, FREDERICK WILLIAM HAINES, a subject of the King of Great Britain and Ireland, residing at "Willandra," Manning Road, in the post-town of East Malvern, a suburb of the city of Melbourne, in the county of Bourke, State of Victoria, Commonwealth of Australia, have invented a new and useful Improved Garden-Hose Support, of which the following is a specification.

The object of this invention is to support a garden hose by its nozzle so that the hose may be readily adjusted to varying heights, turned in any direction and placed at any angle at will. Hitherto primitive devices have generally been used to attain these ends, but by this invention a cheap, portable and efficient appliance is provided whereby any desired adjustment may be speedily effected and water directed to any particular spot without the hose being continuously held by the hand.

Referring to the drawings which form a part of this specification: Figure 1 is a perspective view of this invention. Fig. 2 is a part sectional perspective view of a modified form of this invention.

The invention includes a fork consisting of a stem 2, below which is a bridge 3. Beneath and integral with the bridge are prongs 4. Above the fork is a tubular support having a lower end 5. The stem 2 is accommodated by the lower end 5 and retained therein by a locking screw 6. Threaded into the upper end 7 of the support is a locking screw 8. Accommodated by the upper end 7 of the tubular support is a turn piece consisting of a stem 9 above which is a head 10. Through the head 10 is formed a longitudinal hole hereinafter referred to. Threaded into the head 10 is a locking screw 11.

With the foregoing is used a hose carrier having a stem 12 accommodated by the longitudinal hole in the head 10. Integral with the stem 12 is a lower jaw 13, having therein a threaded hole 14. At the extremity of the lower jaw 13 is formed a lower nozzle bed 15. Pivoted to the lower jaw 13 by a pivot pin 16 is an upper jaw 17 having therein a slot 18. At the extremity of the upper jaw 17 is formed an upper nozzle bed 19. Passing through the slot 18 and accommodated by the threaded hole 14 is an adjusting screw 20.

In a modification of the foregoing, instead of the fork being separate from the tubular support and adjustable in relation thereto, it may be integral with the tubular support as shown in Fig. 2. This may be effected by flattening the lower end 5 of the tubular support and then forming a tripod 22 or the like from the flattened portion, or the tripod may be formed in any other way. In the modification a plate or other spring 21 may also be interposed between the lower jaw 13 and the upper jaw 17.

With this invention (Fig. 1) the fork may be adjusted in the tubular support by turning the locking screw 6. The height of the device is thereby variable. The turn piece may also be adjusted in its relation to the tubular support by turning the locking screw 8. The turn piece it will be seen is not only adjustable vertically, but also in any circumferential direction. To adjust the hose carrier in its relation to the turn piece the locking screw 11 is operated. The jaws of the hose carrier may then be moved either to or from the said turn piece, or the carrier may be canted to any desired angle. To place the nozzle of the hose in the beds 15 and 19 the adjusting screw 20 is slackened back and after the nozzle has been placed in position the said screw is turned to bring the jaws 13 and 17 together.

Having now described my invention what I claim as new and desire to secure by Letters Patent is:—

1. An improved garden hose support, comprising a tubular support, a fork at the bottom of said support, a turn piece accommodated by the upper end of said support and adjustable in relation thereto, means for locking the turn piece to the support, a horizontal hose carrier adjustably mounted in said turn piece, means to permit adjusting and locking said hose carrier, an upper pivoted jaw and a lower stationary jaw on the hose carrier, each jaw having a nozzle bed, and means for adjusting the pivoted jaw and locking the hose nozzle within the nozzle beds.

2. An improved garden hose support, consisting of a tubular support, a fork at the lower end of said support, a locking screw retaining said fork to said support, a turn piece accommodated by the upper end of said support, a locking screw retaining said turn piece in position, a hose carrier having a stem accommodated by said turn piece, a locking screw retaining said stem in position, a lower jaw adjoining said stem, an upper jaw pivoted to said lower jaw, a nozzle bed formed in each said jaw, and an adjusting screw extending between said jaws.

3. An improved garden hose support consisting in the combination of a fork having a stem, a tubular support above and accommodating said stem, a locking screw retaining said stem to said support, a turn piece having a stem accommodated by said support, a locking screw carried by said support to bear against said turn piece stem, a head above said stem, a locking screw carried by said head, a hose carrier having a stem accommodated by said head, a lower jaw integral with the hose carrier stem and having a nozzle bed, an upper jaw pivoted to the lower jaw, said upper jaw having a slot therein and a nozzle bed, and an adjusting screw passing through the slot and into the lower jaw.

4. An improved garden hose support, comprising a tubular support provided with a fork at its lower end, a turn piece including a head formed with an opening and a stem, said stem fitting in the upper end of the tubular support, means for adjustably locking the stem in the tubular support, a hose carrier including a stem at one end which fits in the opening in the head of the turn piece and a stationary lower jaw at its opposite end, means for locking the stem of the hose piece in the head, an upper jaw pivoted to the hose carrier, and an adjusting screw engaging the upper pivoted jaw and the hose carrier whereby to clamp a hose in position.

5. An improved garden hose support, consisting in the combination of a tubular support having a fork at its lower end, a locking screw threaded into the upper end of said support, a turn piece having a stem accommodated by the upper end of said support, a head having a longitudinal hole therein above said stem, a locking screw threaded into said head, a hose carrier having a stem accommodated by the longitudinal hole in the head, a lower jaw integral with the carrier stem, said jaw having a threaded hole therein and a nozzle bed, an upper jaw pivoted to the lower jaw, said upper jaw having a slot therein and a nozzle bed, an adjusting screw passing through said slot into the threaded hole in the lower jaw, and a plate spring interposed between and bearing against the upper and lower jaws to move the upper jaw from the lower jaw.

In testimony whereof I have hereunto affixed my signature in the presence of two subscribing witnesses.

FREDERICK WILLIAM HAINES.

Witnesses:
  EDWIN PHILLIPS,
  ALAN McEACHEN.

---

Copies of this patent may be obtained for five cents each, by addressing the "Commissioner of Patents, Washington, D. C."